(12) United States Patent
Cain et al.

(10) Patent No.: US 7,373,215 B2
(45) Date of Patent: May 13, 2008

(54) TRANSISTOR GATE SHAPE METROLOGY USING MULTIPLE DATA SOURCES

(75) Inventors: Jason Phillip Cain, Sunnyvale, CA (US); Bhanwar Singh, Morgan Hill, CA (US); Iraj Emami, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 11/469,206

(22) Filed: Aug. 31, 2006

(65) Prior Publication Data

US 2008/0058978 A1    Mar. 6, 2008

(51) Int. Cl.
G06F 19/00    (2006.01)
(52) U.S. Cl. .................................. 700/121; 700/29
(58) Field of Classification Search ............... 700/28, 700/29, 32, 118, 119, 120, 121, 124
See application file for complete search history.

(56) References Cited

U.S. PATENT DOCUMENTS

| | | | |
|---|---|---|---|
| 5,621,652 A * | 4/1997 | Eakin .............................. | 716/5 |
| 6,978,229 B1 * | 12/2005 | Saxena et al. .................. | 703/4 |
| 6,988,017 B2 * | 1/2006 | Pasadyn et al. ............. | 700/121 |
| 7,085,676 B2 * | 8/2006 | Opsal et al. ................. | 702/182 |
| 2004/0181768 A1 * | 9/2004 | Krukar .......................... | 716/19 |
| 2005/0057748 A1 * | 3/2005 | Vuong et al. ............. | 356/237.5 |
| 2005/0192914 A1 * | 9/2005 | Drege et al. .................. | 706/12 |
| 2005/0216109 A1 * | 9/2005 | Radigan et al. ............... | 700/97 |
| 2006/0187466 A1 * | 8/2006 | Li et al. ....................... | 356/601 |
| 2007/0026321 A1 * | 2/2007 | Kumar ........................... | 430/5 |

OTHER PUBLICATIONS

Opsal et al. "Real-time Opticla CD Metrology for Litho Process", 2003, Proceedings of SPIE, vol. 5038 pp. 496-507.*
Gorelikov et al.,"CD-SEM-based Critical Shape Metrology of Integrated Circuits", Proceedings of SPIE, 2004,pp. 1-10.*
Arisha et al., "A simulation model to characterize the photolithography process of a semiconductor wafer fabrication", 2004, Elsevier, pp. 2071-2079.*
Stoddard et al.; "Application of Feed-Frpward and Adaptive Feedback Control to Semiconductor Device Manufacturing"; Jun. 1994; Proceedings of the American Control conference; pp. 892-896.*

* cited by examiner

*Primary Examiner*—Leo Picard
*Assistant Examiner*—Chad Rapp
(74) *Attorney, Agent, or Firm*—Amin, Turocy & Calvin, LLP

(57) ABSTRACT

The claimed subject matter can provide a mechanism for ascertaining a variety of metrological data relating to one or more features (e.g., a transistor gate) of a chip/wafer. In addition, results of electrical testing on the chip/wafer can also be gathered and, together with the metrological data, input to a data store. From the information in the data store, a three-dimensional model for the feature(s) of the chip/wafer can be constructed and subjected to analysis, testing, and/or simulation. As well, the three-dimensional model can be optimized and an optimized three-dimensional model can be employed to affect process control in a feedback/forward manner, e.g., to apply optimizations to the next or the current wafer, respectively. Accordingly, the disclosed mechanisms may be used to optimize semiconductor performance, yield, or for research and development. In addition the three-dimensional model may be used in analysis, simulation, or debugging software.

19 Claims, 17 Drawing Sheets

(CROSS-SECTION)

(TOP-DOWN)

TRANSISTOR GATE SHAPE METROLOGY USING MULTIPLE DATA SOURCES

TECHNICAL FIELD

The claimed subject matter relates generally to metrology of features/structures (e.g., a transistor gate) on a semiconductor wafer and/or integrated circuit, and specifically to creating a three-dimensional model for a feature or set of features by reference to multiple data sources, employing the model to predict performance, and/or utilizing feedback to modify the fabrication.

BACKGROUND

As use of and demand for semiconductor devices increases, improvements in size, performance and yield are constantly being developed and improved. Achieving the objectives of miniaturization and higher packing densities continue to drive the semiconductor manufacturing industry toward improving semiconductor processing in every aspect of the fabrication process. Semiconductor manufacturers often employ metrology techniques to improve the quality of the wafers and the wafer manufacturing processes. For example, semiconductor metrology information is utilized to calibrate device simulators, aid in electrical testing, predict the performance of devices during the manufacturing process, aid in semiconductor research and development, or aid in process control for present or future semiconductor manufacturing techniques. In addition, metrology is used to aide in feedback or feed-forward semiconductor manufacturing.

Semiconductor fabrication is a manufacturing process that includes a large number of steps and/or processes that control and build the devices. The basic processes utilized are layering, doping, heat-treating, and pattering. The layering process adds thin layers to a wafer surface. Layers can be insulators, semiconductors and/or conductors, for example, and are grown or deposited through a variety of process including chemical vapor deposition (CVD), evaporation, and sputtering. The doping process adds specific amounts of dopants to the wafer surface, which can modify the layer properties (e.g., change a semiconductor to a conductor). Doping techniques include thermal diffusion and ion implantation. During the heat-treating process, a wafer is heated and cooled to achieve specific results.

The various processes involved in creating a semiconductor wafer all exhibit variations that are not always accurately predicted using current design methods. These variations may result from approximations made during the design process, material heterogeneity, containments introduced during the manufacturing process, limitations in manufacturing accuracy or precision, or from unknown sources. It is thus advantageous for a manufacturer to assess the physical characteristics of a wafer throughout and after the manufacturing process to improve performance and yield of the wafer. Measurements made during the manufacturing process may be used to determine the shape metrology of the components on the wafer to help achieve the manufacturer's goals.

Transistor gate metrology (e.g., size, shape . . . ) is especially useful for wafer analysis and several methods are employed to determine the dimensions of the transistors on a wafer. Certain metrology techniques are used to measure the thickness of various layers found on a wafer or transistor including measurement of film thickness of the dielectric layers or film thickness of the gate layers. Image processing from, a critical dimension scanning electron microscope (CD-SEM) is also used to determine shapes of the various structures including the top-down shape of the gates. Overlay data is also used to determine which part of the gate feature actually falls within the source/drain implant region to form the active transistor.

However, none of these metrology techniques can provide a complete picture for a transistor gate, because the measurements taken typically only produce accurate two-dimensional views. In contrast, an accurate, three-dimensional view of a transistor gate would be much more beneficial in connection with numerous areas of the semiconductor manufacturing process.

SUMMARY

The following presents a simplified summary of the various embodiments in order to provide a basic understanding of some aspects presented herein. This summary is not an extensive overview of the various embodiments. It is intended to neither identify key or critical elements nor delineate the scope of the embodiments. Its sole purpose is to present some concepts in a simplified form as a prelude to the more detailed description that is presented later.

According to the subject matter disclosed and claimed herein, in one aspect thereof, comprises a system that can accurately model a feature (e.g., a transistor gate) of an integrated circuit in three dimensions. The three-dimensional model can be employed to predict the performance of, e.g., a transistor gate and/or device (e.g., an integrated circuit) throughout the manufacturing process so that the process may be modified in a feedback or feed-forward manner. The use of the metrology information can be employed for advanced process control including feed-forward and feedback process control of the gate patterning process for current or future semiconductor manufacturing processes. Moreover, by employing the three-dimensional model, the performance of the chip can be predicted before it can actually be measured. That is, the three-dimensional shape of a transistor can be measured and fed into a three-dimensional transistor model to predict, e.g., the switching speed of the transistor relatively early in the fabrication process. Thus, the model can predict the switching speed shortly after, e.g., a source/drain implant, whereas, conventionally, actual measurement of the switching speed must wait until at least after the first metal patterning step.

The system can include a data store that houses a variety of metrology data as well as other information relating to features of a semiconductor wafer. For example, the data store can be populated with information from a plurality of measurement devices before, during and/or after the fabrication process. The system can also include an analysis component that can employ the data stored in the data store to construct a three-dimensional model of the feature(s) of the integrated circuit. The analysis component can be used for a variety of purposes, for example, the analysis component can be used to aid in achieving improved performance, aid in debugging semiconductor features, and/or to pinpoint potential known problems that are difficult to find with conventional methods.

In accordance therewith, the three-dimensional model may be used in a feedback or feed-forward manner to control the production process. Additionally or alternatively, the three-dimensional model can be used to predict semiconductor performance throughout the manufacturing process with or without the aide of electrical testing. As well, the three-dimensional model can be used to calibrate other modeling software more accurately than was previously possible with or without the aide of electrical testing. It is to be appreciated that the three-dimensional model may represent one semiconductor feature or multiple semiconductor features.

In addition, the model may be a statistical representation of more than one feature. An example of such statistical representation includes features modeled in a min/max fashion or an average of multiple semiconductor features. Another example of possible statistical model includes minimum performance of a group of features so that a maximum clock speed parameter can be determined. Another example is the three-dimensional modeling of features found in a certain portion of the wafer, such as a critical path, so that the models may be used to determine performance characteristic of a section of the semiconductor wafer that is of more concern to designers. Any of the herein mentioned models may be used in a feedback or a feed-forward manner to adjust various aspects of the manufacturing process in real-time or post manufacturing.

According to another aspect of the claimed subject matter, a method of taking measurements to construct a three-dimensional model of features found on a semiconductor wafer. Such method may include measuring semiconductor features and storing data relating to the measurements to a data store. From the data in the data store, a three-dimensional model of the feature(s) can be constructed. The three-dimensional model can be a statistical model as well.

The following description and the annexed drawings set forth in detail certain illustrative aspects of the disclosed embodiments. These aspects are indicative, however, of but a few of the various ways in which the principles of the embodiments may be employed and the subject disclosure is intended to include all such aspects and their equivalents. Other advantages and novel features will become apparent from the following detailed description when considered in conjunction with the drawings.

DETAILED DESCRIPTION

Figure 1:
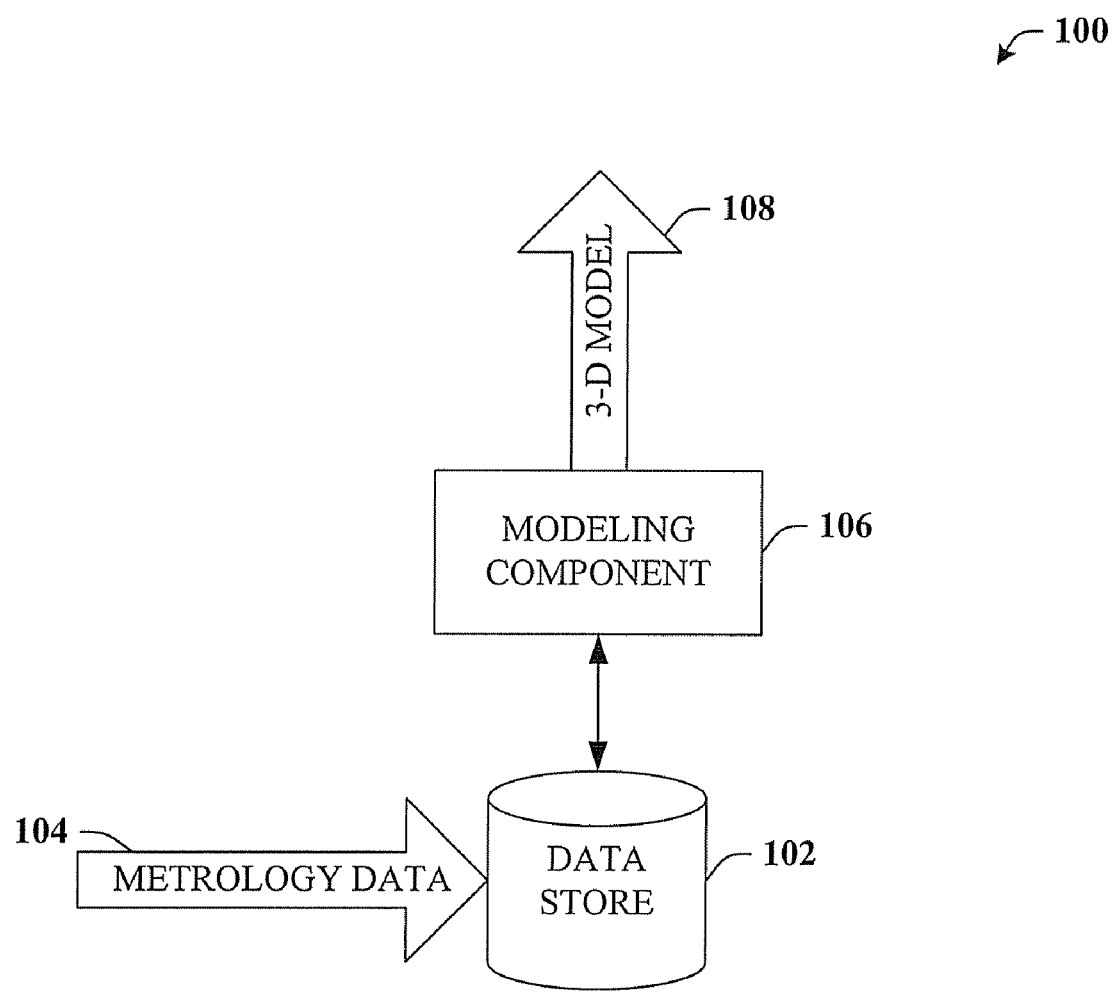
FIG. 1 illustrates a system that can accurately model a feature of a semiconductor wafer in three dimensions.

The various embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the embodiments may be practiced without these specific details. In other instances, well-known structures and devices are shown in block diagram form in order to facilitate describing the embodiments.

As used in this application, the terms "component," "module," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used herein, the terms to "infer" or "inference" refer generally to the process of reasoning about or inferring states of the system, environment, and/or user from a set of observations as captured by way of events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Inferences can also be based on statistical (e.g., probabilistic or Bayesian) models, fuzzy logic systems, artificial neural nets, or any combination of these.

Referring now to the drawings, FIG. 1 depicts a system 100 that can accurately model a feature of a semiconductor wafer in three dimensions. Generally, the system 100 can include a data store 102 that stores data relating to semiconductor fabrication. For example, the data store 102 can receive metrology data 104 that can correspond to a feature (e.g., a transistor gate) of an integrated circuit and/or a semiconductor wafer. The metrology data 104 can be obtained from substantially any device utilized for wafer metrology. Such devices can include, but are not limited to devices that can measure the thickness of a dielectric material (e.g., oxide film), silicon or polysilicon layer, a photoresist layer, critical dimensions, gate overlay, and the like. Hence, the aforementioned devices can include an optical camera/device, a scanning electron microscope (SEM), a polysilicon FICD measurement device, an atomic force microscope, etc. It is to be appreciated that the measurements can be obtained in situ and in real-time as an integrated circuit is being manufactured and/or the wafer is being processed. In fact, certain measurements such as the oxide film thickness are very difficult to measure after other layers (e.g., polysilicon layer) have been deposited.

The system 100 can also include a modeling component 106 that is operatively coupled to the data store 102. The modeling component 106 can retrieve the metrology data 104 stored in the data store 102 in order to create a three-dimensional model 108 of the measured feature(s). That is, if the metrology data 104 relates to the dimensions of a transistor gate (as measured by any number of metrology tools), the modeling component can construct a three-dimensional model 108 of the transistor gate. In one aspect, the various orthogonal views of the transistor gate, e.g., each provided by a different metrology tool, can be interpolated in order to create the three-dimensional model 108. For example, data such as oxide thickness and polysilicon thickness can be abstracted with an SEM top-down view to produce the three-dimensional model 108. By employing the metrology data 104 from a variety of sources, the accuracy and capabilities of a model (e.g., three-dimensional model 108) can be improved.

The three-dimensional model 108 can be employed, inter alia, to predict performance of the feature or features being modeled. Moreover, this predicted performance can occur at a relatively early stage in a semiconductor manufacturing process, and as such be much more timely than waiting for actual performance measurements. Since it is often the case that metrological information (e.g., metrology data 104) can be obtained at the initial stages of fabrication, whereas actual performance testing cannot occur until at least the final stages of fabrication or post-fabrication, ascertaining a prediction of performance can be extremely useful. Hence, three-dimensional model 108 can be constructed entirely or in part from metrology data 104 at very early stages of fabrication, and be employed to, e.g., provide very accurate predictions regarding performance.

Figure 2:
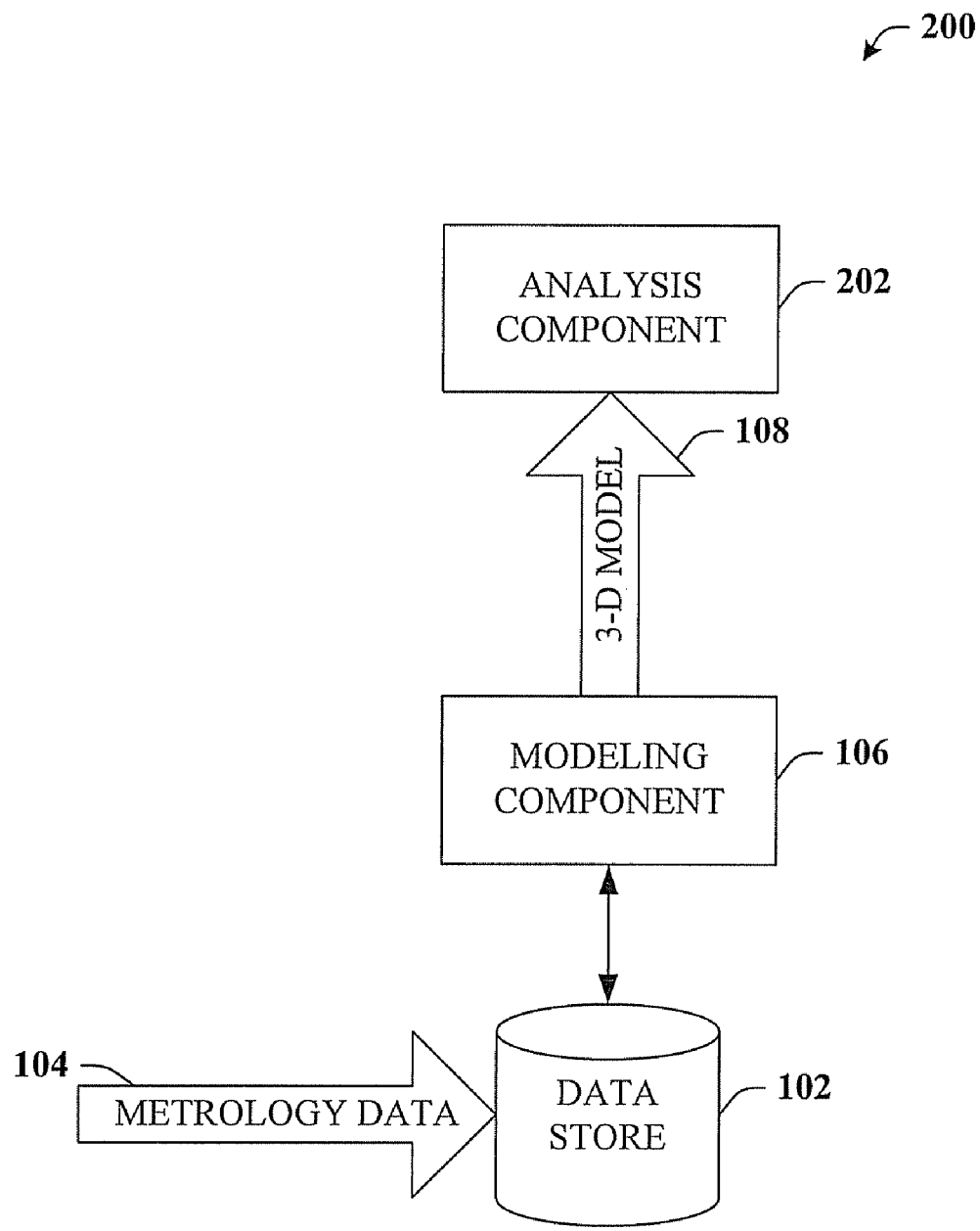
FIG. 2 depicts a system that can model a wafer feature and can analyze the model to test and/or predict performance.

Referring now to FIG. 2, a system 200 that can model an integrated circuit feature and can analyze the model to test and/or predict performance of the feature is illustrated. In general, the system 200 can include a data store 102 that can receive metrology data 104 associated with a feature of an integrated circuit; a modeling component 106 that can create a three-dimensional model 108 of the feature; and an analysis component 202. The analysis component 202 can employ various metrological aspects (e.g., size, shape . . . ) of the three-dimensional model 108 in order to subject the model to a series of tests and/or predict the performance of the modeled feature more accurately than conventional two-dimensional models. For example, a certain path (e.g., a critical path) of an integrated circuit can be analyzed to estimate, e.g., the speed through the path. If it is determined that the overall speed is too low, one or a number of the transistor gates along the path can be modified. For instance, the size of the gate(s) can be reduced in the model and the analysis component 202 can rerun the performance tests in order to, e.g., ascertain if the modified model can meet certain thresholds.

It is to be appreciated that these thresholds can be predetermined based upon, for instance, minimum performance tolerance. In addition, e.g., when the three-dimensional model 108 models a plurality of features, the analysis component 202 can employ intelligence algorithms to streamline the topology of the three-dimensional model 108 in order to enhance performance. For example, the analysis component 202 can examine the entirety or a subset of the features in the three-dimensional model 108 and can provide for reasoning about or infer states of the three-dimensional model 108 from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Still referring to FIG. 2, if the modified model does meet the threshold (e.g., a desired performance for a parameter or testing metric), then a new metrology for the feature can be determined. Once the new metrology is determined, the analysis component can, for example, determine and/or infer how to change the manufacturing process such that a feature with the new metrology can be fabricated instead of the previous (e.g., sub-optimal) feature. It is to be appreciated that the parameter and/or testing metric can be predetermined, input by a user (e.g., a design engineer) and/or inferred dynamically.

Figure 3:
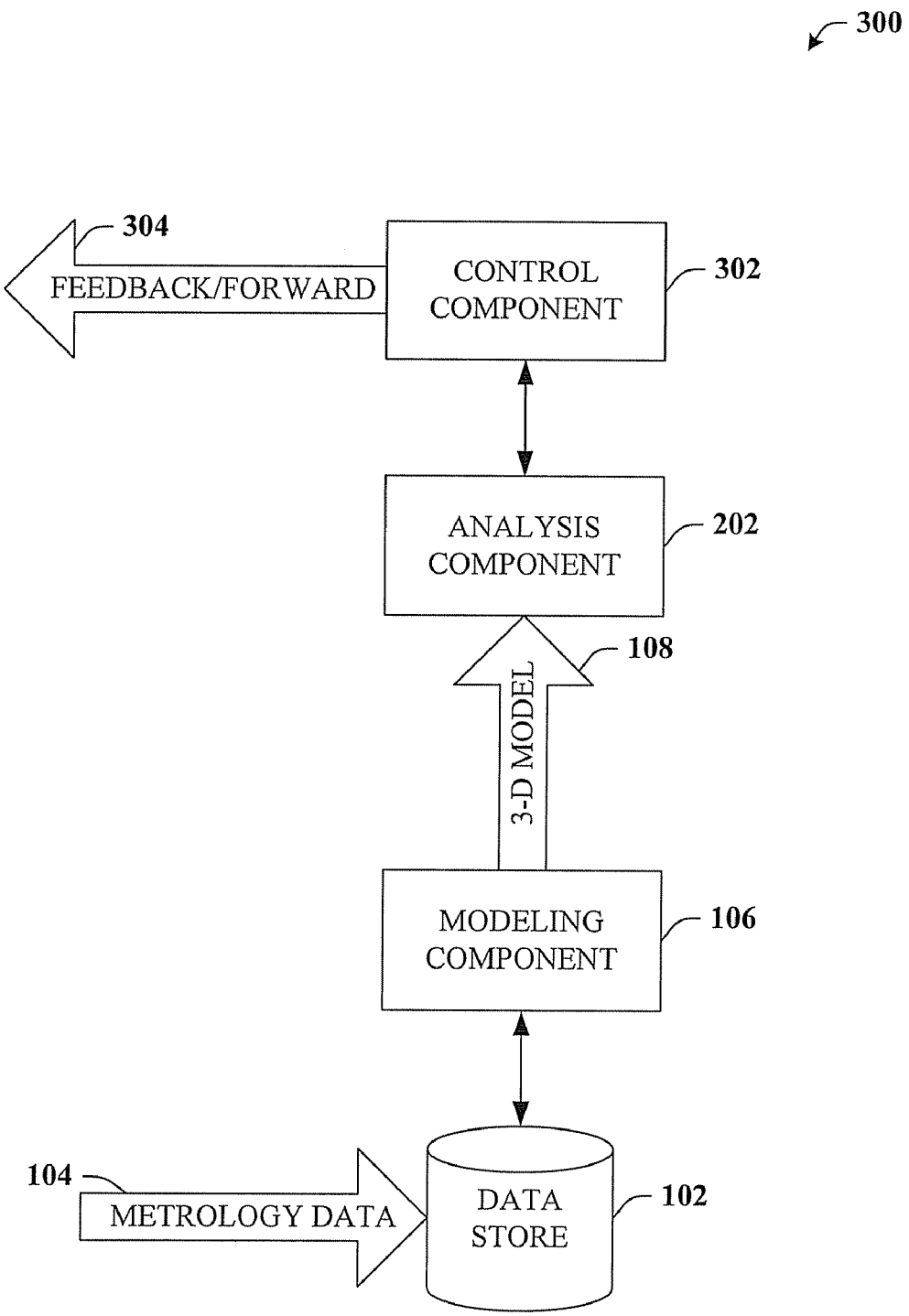
FIG. 3 is a block diagram illustrating a system that can utilize the three-dimensional model for feedback/feed-forward manufacturing.

Turning now to FIG. 3, a system 300 that models an integrated circuit feature and analyzes the model to predict performance of the feature in order to control the fabrication process is depicted. Generally, the system 300 can include a data store 102 that can receive metrology data 104 associated with a feature of an integrated circuit; a modeling component 106 that can create a three-dimensional model 108 of the feature; an analysis component 202 that can utilize the three-dimensional model 108 in order to tests and/or predict the performance of the modeled feature; and a control component 302. The control component 302 can effectuate process control, for example by implementing the new metrology of the feature described with reference to FIG. 2. The control component 302 can thus transmit control information 304 to, e.g., semiconductor fabrication devices in order to manufacture the improved feature.

It is to be appreciated that the control component 302 can affect process control in real-time. Additionally, the control component 302 can effectuate process control in either a feed-forward manner such that the current wafer under fabrication processes can receive the benefits of the modifications. The process control can be implemented in a feedback loop, as well. Since the three-dimensional model 108 can be more accurate than conventional models, it is to be appreciated that the ability for process control, either through feedback or feed-forward loops can be improved as well.

Figure 4:
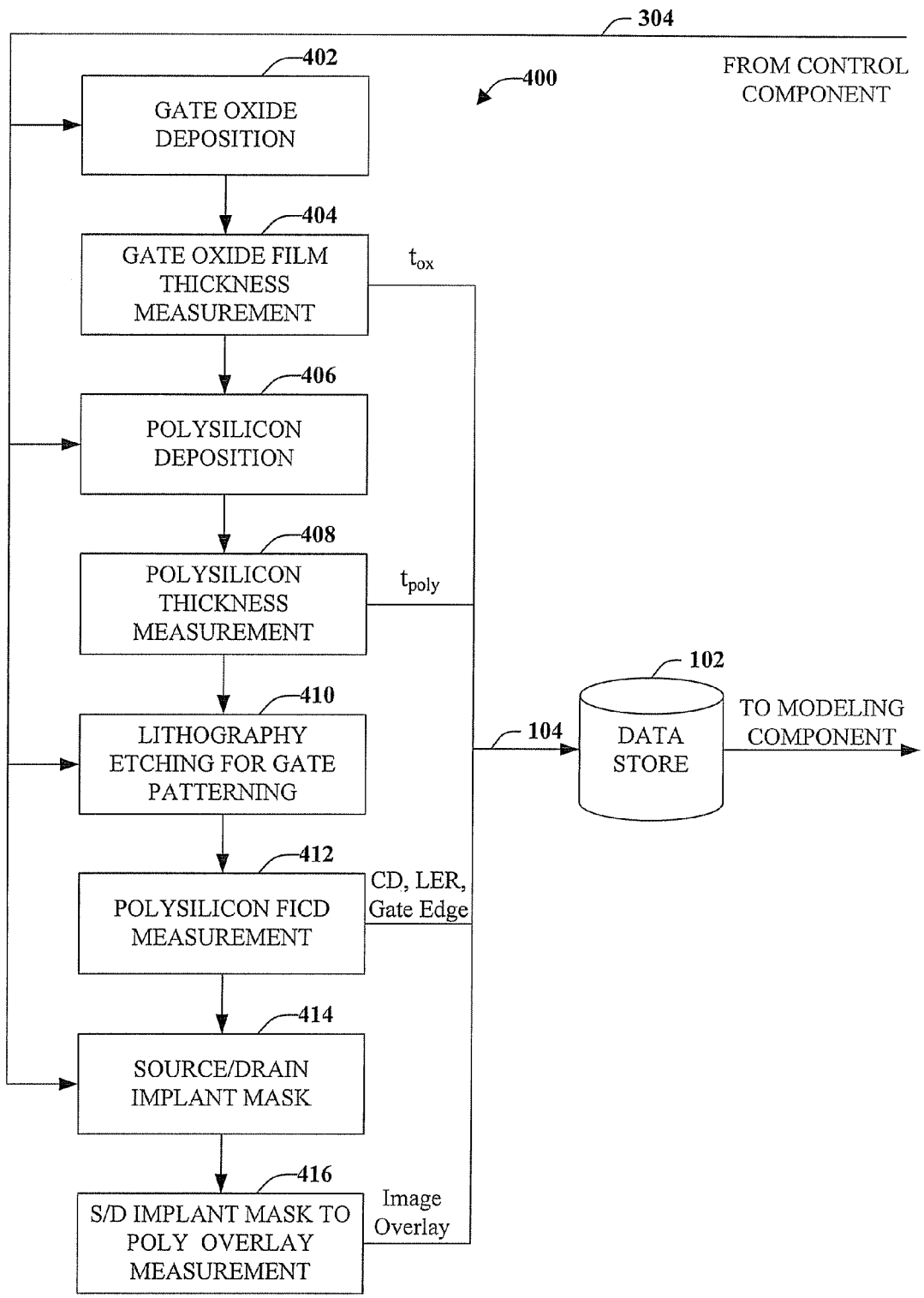
FIG. 4 illustrates an exemplary flow chart of procedures for populating a data store with metrology data.

FIG. 4 illustrates methodology 400 in accordance with the claimed subject matter. While, for purposes of simplicity of explanation, the one or more methodologies shown herein are shown and described as a series of acts, it is to be understood and appreciated that the claimed subject matter is not limited by the order of acts. Some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 4, an exemplary computer implemented methodology 400 for populating a data store with metrology data during chip/wafer manufacturing. In general, at 402 an oxide layer (typically a dielectric material) can be deposited on a chip/wafer. Act 402 can be any manner of depositing a gate oxide on a surface of a chip/wafer can be employed. At 404, the gate oxide film thickness, $t_{ox}$, can be measured, e.g., by an optical device, or substantially any device in a suite of metrology tools capable of obtaining $t_{ox}$. The oxide film thickness, $t_{ox}$, can therefore constitute metrology data 104, and be stored in the data store 102, as described supra in connection with FIG. 1. It is to be understood and appreciated that the measurements that produce metrology data 104 described herein may occur during or after the applicable manufacturing step, respectively. For example, measurements for $t_{ox}$, obtained at act 404 can occur during or after the gate oxide deposition act 402.

At 406, the chip/wafer can undergo a polysilicon deposition. The polysilicon deposition may be any means of depositing polysilicon on the chip/wafer. Likewise, at 408, after or during polysilicon deposition, polysilicon thickness, $t_{poly}$, measurement can be obtained by one or more metrology devices. The polysilicon thickness, $t_{poly}$, can also constitute metrology data 104 and be input to the data store 102. At 410, lithography etching for gate patterning can be applied to the chip/wafer, and at 412, the suite of metrology tools can supply relevant measurements for the particular feature via a polysilicon FICD measurement. For example, a scanning electron microscope, or other metrology tool can supply a top-down view of the feature such as a transistor gate. Hence, metrology data 104 such as the critical dimension (CD), line edge roughness (LER), and/or the gate edges can be input to the data store 102.

Similarly, at 414, the chip/wafer can undergo a source/drain implant mask. The method used in source/drain implant mask may be any method to accomplish source/drain implant masking. During or after source/drain (S/D) implant mask is implemented, at 416, a S/D implant mask to polysilicon gate overlay measurement can be resolved by a suitable metrology tool in the metrology suite. This image overlay measurement can also be a portion of the metrology data 104 and input to the data store 102. In accordance with an aspect of the claimed subject matter, an analysis component (not shown) can employ the metrology data 104 stored in the data store 102 to construct an accurate three-dimensional model of the feature(s). This model can be employed with a variety of tests and/or simulations to determine, e.g., the performance of the modeled feature(s), as well as inferences relating to design modifications that may further improve performance.

In accordance with another aspect of the claimed subject matter, a control component (not shown) supply feedback and/or feed-forward information 304 in order to modify and/or control the fabrication process of the chip/wafer. In accordance therewith, feedback and/or feed-forward information 304 can be looped into and utilized by any or all of the acts, 402, 406, 410, 414, as well as other acts not shown but within the spirit and scope of the claimed subject matter. It is to be appreciated that method 400 is intended only an exemplary illustration of the claimed subject matter and not intended to be exhaustive. There may be additional or fewer system acts (e.g., acts 402-416) and/or the components (e.g., components 102-104) may be combined. All such modifications are considered a part of the subject disclosure and appended claims.

Figure 5:
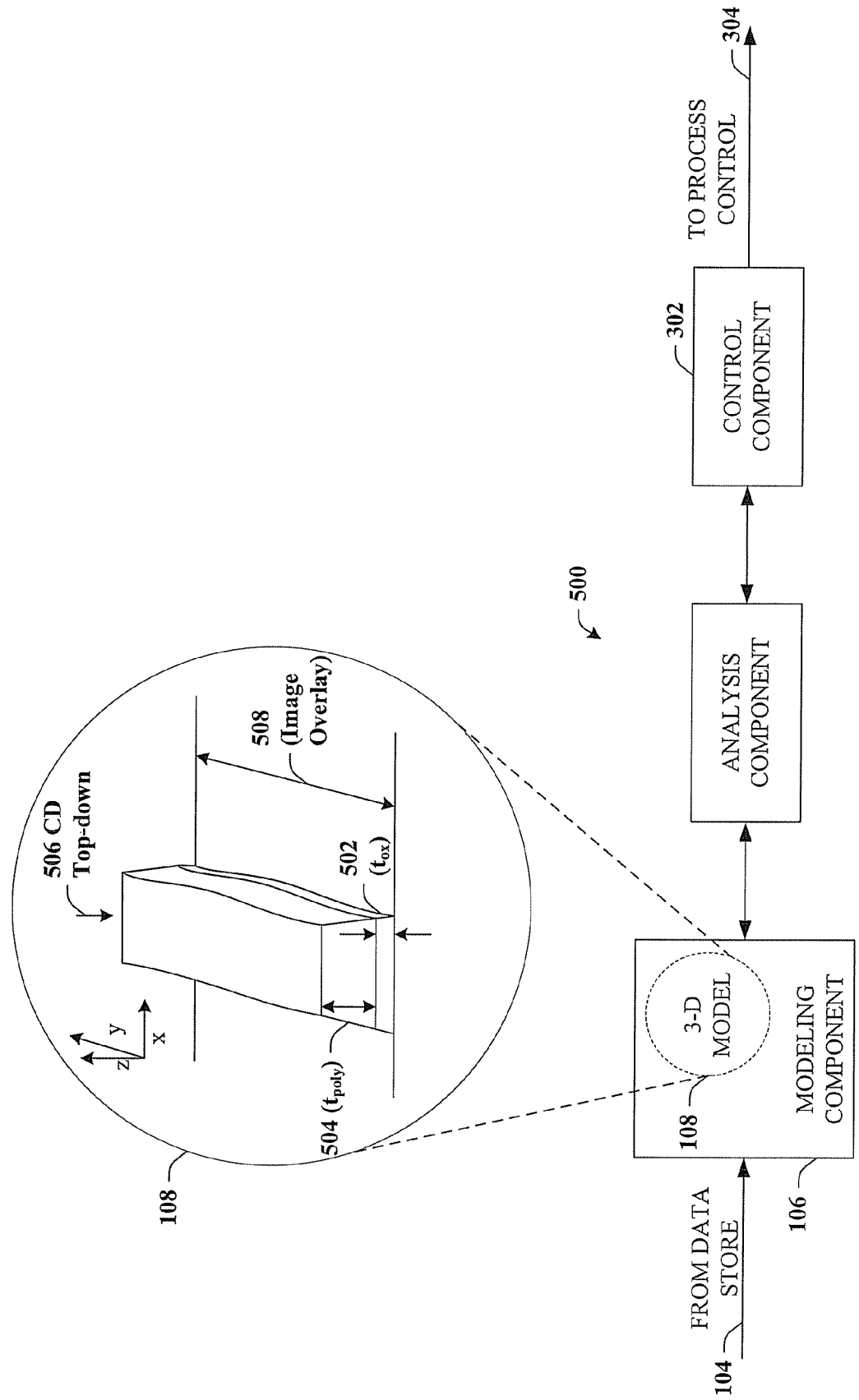
FIG. 5 is an exemplary illustration of a system that can construct a three-dimensional model of a transistor gate from metrology data.

Turning now to FIG. 5, a system 500 with an exemplary three-dimensional model of a transistor gate constructed from metrology data is shown. In general, the system 500 can include a modeling component 106 that constructs a three-dimensional model 108 from metrology data 104, typically from a data store (not shown). It is to be appreciated that although only a single transistor gate is depicted, the three-dimensional model 108 can include many such transistor gates and/or other chip/wafer features. The system 500 can also include an analysis component 202 that can employ the three-dimensional model 108 in order to tests and/or predict the performance of the transistor gate and a control component 302 that can output feedback/forward information 304 to affect process control.

The three-dimensional model 108 rendered by the modeling component 106 is shown in greater detail in the upper portion, which depicts a model of the transistor gate. By a variety of metrology data 104 obtain from numerous metrology tools, as described supra, the three-dimensional model 108 can be constructed. For example, metrology data 104 relating to the oxide film thickness can be employed to create the modeled film thickness 502. Similarly, metrology data 104 representing, e.g., polysilicon thickness, CD, LER, gate edges and gate overlay can be utilized to construct the modeled polysilicon thickness 504, the top-down (x-y plane) CD and line shape 506 and the overlay data 508 (e.g., to determine which part of the line falls within the S/D implant), respectively.

Figure 6:
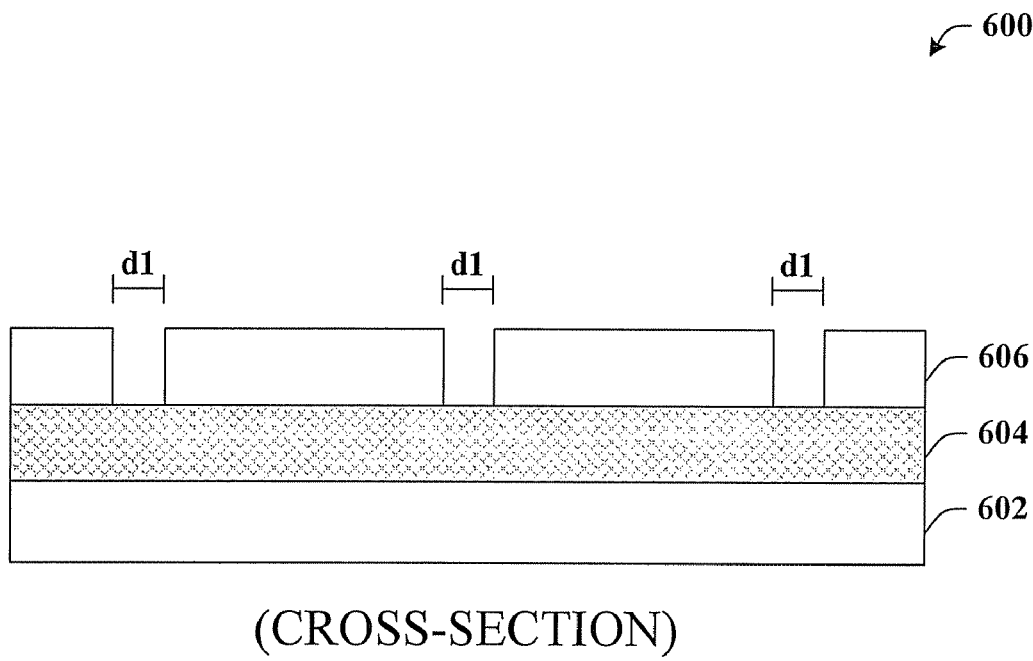
FIG. 6 is a cross-sectional and top-down illustration of a typical wafer with three transistor gates depicted.
Figure 6:
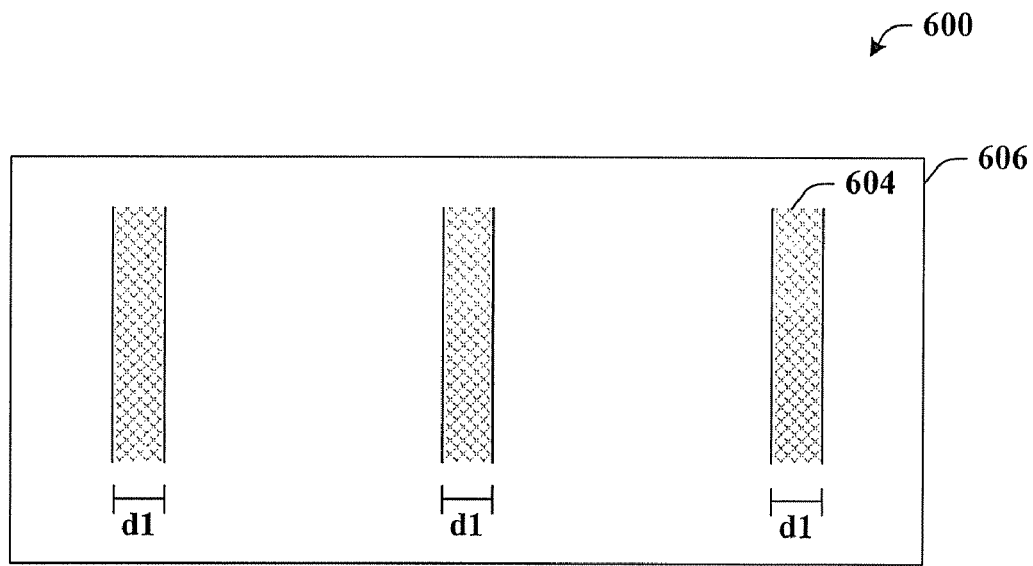

Referring briefly to FIG. 6, an exemplary cross-sectional view of a wafer 600 with extant gate lines exhibiting a CD, d1, between gate lines is illustrated. The wafer 600 can comprise a silicon or polysilicon substrate 602, at least one layer of gate oxide and/or dielectric material 604 overlying the substrate 602, and a photoresist layer 606 overlying the at least one dielectric layer 604. The at least one dielectric layer can be, for example, a silicon carbonitride layer (SiCN), a silicon oxycarbide layer (SiOC:H), a silicon dioxide layer ($SiO_2$), and a silicon oxynitride layer (SiON). However, it is to be understood that the structure can comprise at least one dielectric layer and one or more dielectric layers, which may or may not be arranged in the order described above. The photoresist layer 606 can be, for example, a short wavelength photoresist layer that has been patterned with an image corresponding to a gate formation utilizing 193 nm or less radiation. An image can be patterned on the photoresist layer 606 utilizing short wavelength radiation, thereby exposing portions of the dielectric layer 604. Short wavelength radiation specifically comprises about 193 nm light and about 157 nm light or less. The image can, for example, correspond to one or more trenches and/or transistor gates. FIG. 6 also illustrates a top-down view of a wafer 600 with three transistor gates.

Figure 7:
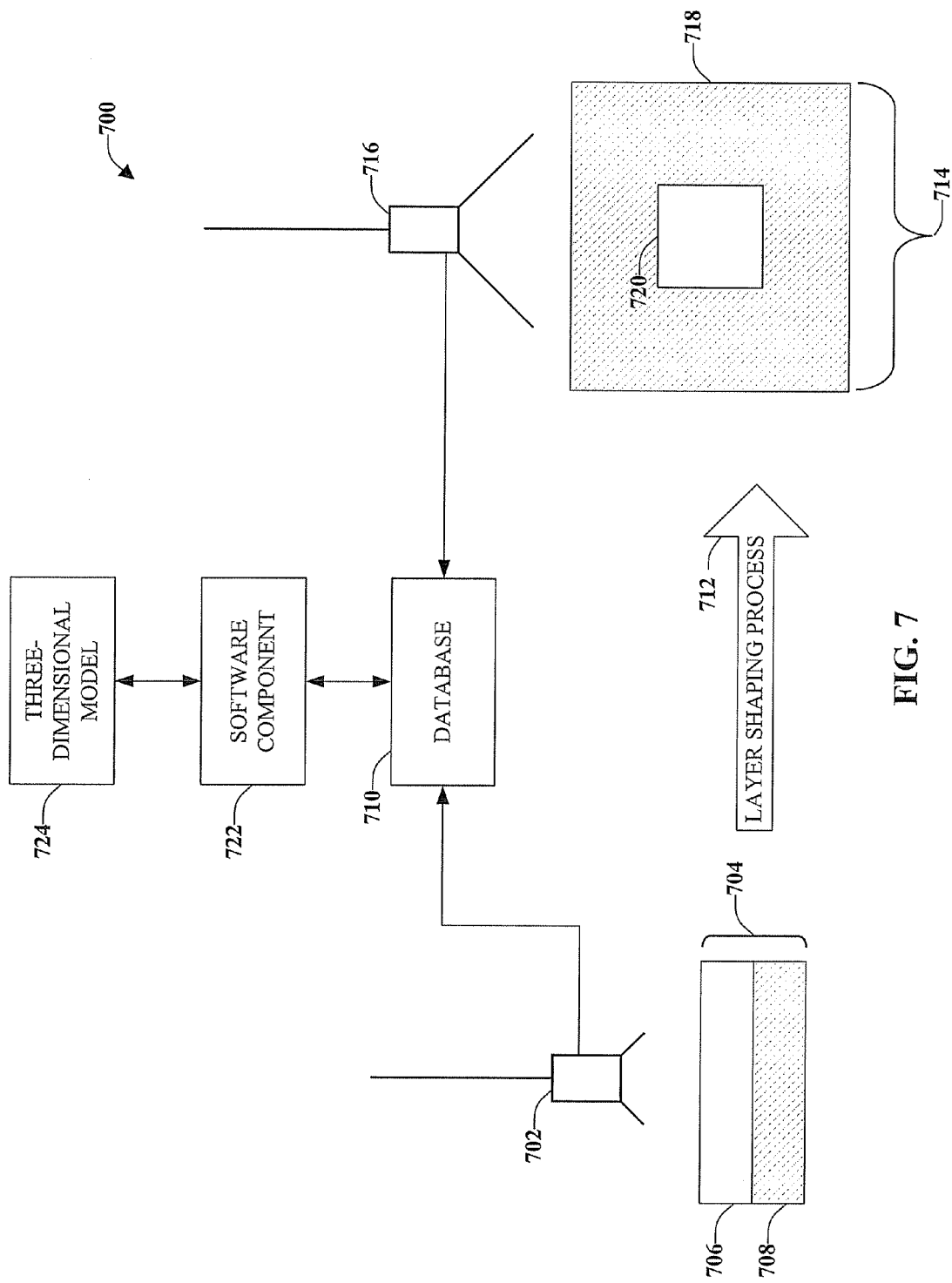
FIG. 7 is a block diagram of a system that creates a three-dimensional model using a thickness measurement in combination with an edge detection measurement.

Turning now to FIG. 7, a system 700 that creates a three-dimensional model using a thickness measurement in combination with an edge detection measurement is depicted. A wafer side view 704 is shown with a layer 706 and a layer 708. Wafer 704 is shown as having only two layers 706, 708 but it is to be appreciated that showing two layers is only exemplary and is not intended to limit the subject matter described herein to only two layer wafers. Hence, wafer 704 can have more than two layers. Measurement device 702 measures the thickness of layer 706. Measurement device 702 may be a device that is a gate oxide film thickness measurement, polysilicon thickness measurement, poly FICD measurement, or other measurement device that may determine the layer thickness. Alternatively, film thickness may be estimated by assuming the thickness based upon the process used to create the layer, for example, using a known CVD technique in which the layer thickness may be estimated. Also, the thickness may be determined with a combination of measurements and estimations of the layer thickness. The layer thickness measurement may be used to form a z-axis component of a three-dimensional model 724 by the software component 722. Three-dimensional model 724 can have an x, y, and z component, each of which can be resolved by various metrology tools, such as measurement device 702.

After measurement device 702 completes measuring wafer 704, wafer 704 can undergo a layer shaping process 712. Layer shaping process 712 may include lithography or etching processes or other layer shaping techniques. After the layer shaping process 712, wafer 704 now takes the form of wafer 714, depicted from top-down view. Layer 708 is now shown as layer 714 and layer 706 is shown, after modified by the layer shaping process 712, as layer 720. Layer 708 may have been modified by layer shaping process 712 but modification is not shown. Measurement sensor 716 now measures the edges of layer 720 by way of an edge detection technique, for example by an optical method, an atomic force microscope, scanning electron microscope or image processing from an optical measurement device such as a camera.

Additionally or alternatively, the edges of the structure may be estimated from referencing the etching mask, by measuring the etching mask, or any combination of sensing and estimating the top-down shape of layer 720. Measurement sensor 716 places the measurement data into database 710. The measurement data obtained from sensor 716 can be used by software component 722 to construct the X and Y components of three-dimensional model 724. Software component 722 constructs the three-dimensional model 724 by accessing database 710 and analyzing the data that represent x-, y-, and z-axes that may become three-dimensional model 724. Measurement sensor 702 and measurement 716 may be combined into one sensor element and is only shown as separate sensor as exemplary. Moreover, the thickness measurement may be implemented after the wafer undergoes a layer shaping process.

Actual results sometimes differ from predicted results and factors such as overexposure or underexposure could have created edges that do not accurately reflect the photomask. Another unexpected result could be shown by referencing the data from sensor 716 about the overall features of layer 720. For example, the three-dimensional model 724 might indicate that the layer 720 is too thin near the edges, possibly a result of a poor photomask. Additionally, it could be determined if the photomask was not properly aligned during exposure and/or that the edges could be in a place that was not anticipated. Three-dimensional model 724 could show this misalignment.

Figure 8:
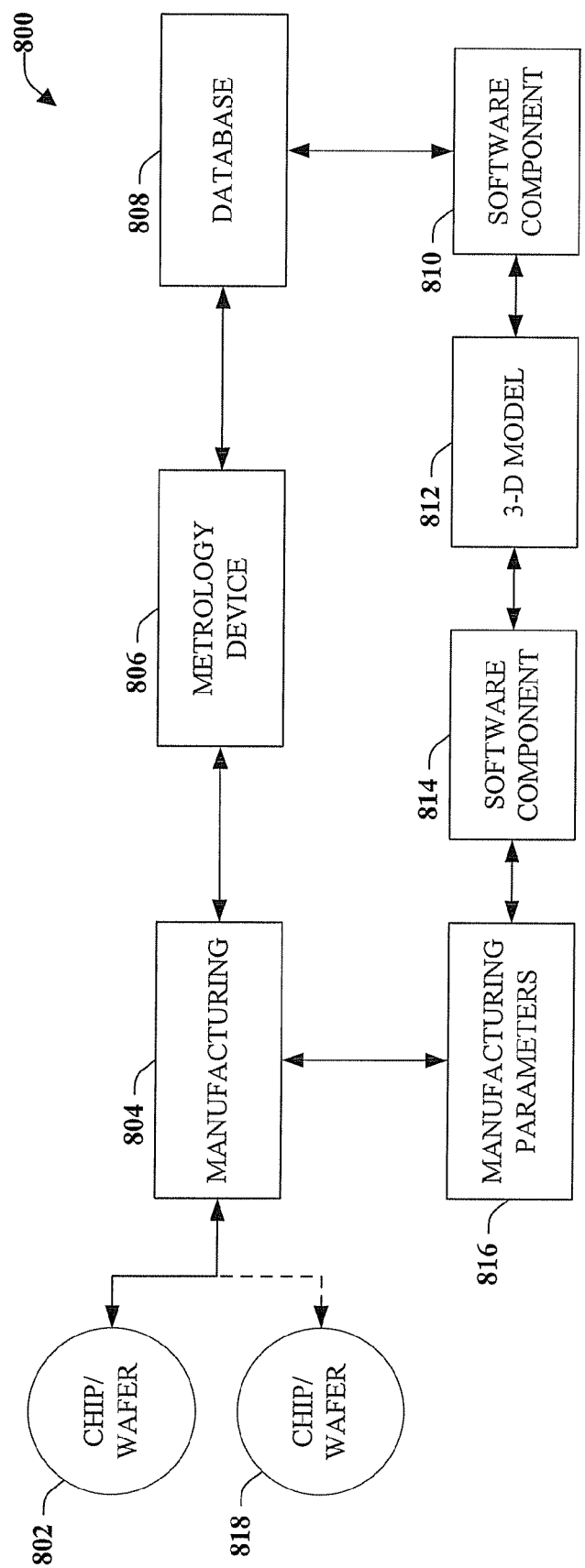
FIG. 8 is a block diagram illustrating a system that utilizes a three-dimensional model to facilitate a feedback loop for manufacturing process control.

Referring now to FIG. 8, a block diagram of a system 800 that uses a feedback loop to adjust a semiconductor manufacturing process is illustrated. The system 800 can include a chip/wafer 802 that undergoes manufacturing step 804. Manufacturing step 804 may be any process used to modify chip/wafer 802. Manufacturing step 802 may be gate oxide deposition, polysilicon deposition, lithography etching for gate patterning, source or drain implant mask, or other semiconductor-manufacturing act. There may be additional or fewer system components and/or the components may be combined. All such modifications are considered a part of the subject disclosure and appended claims.

After or during manufacturing step 804, metrology device 806 can obtain data from chip/wafer 802, which can be entered into database 808. Software component 810 can employ information from database 808 to construct three-dimensional model 812. Three-dimensional model 812 may be a model of any feature or set of features of chip/wafer 802. Three-dimensional model 812 then can be used by software component 814 to produce manufacturing parameters 816. The manufacturing parameters 816 may be used to adjust manufacturing step 804. Manufacturing step 804 is thus ready to perform a subsequent action on chip/wafer 818. System 800 is thus operating in a feedback manner.

Typical metrology testing can include critical dimensions measurements, which can include the widths of the lines and spaces of critical circuit patterns including the area of contacts. Other measurements taken can include film thickness and/or overlay, which is superposition of a pattern on a mask to a pattern previously created on the surface of the wafer. The measurements can be made upon several device test structures that are placed at various locations within a chip. In addition or alternatively, system 800 may also use data gained from the process to analyze quality parameters of the fabrication process to determine if device quality is within an acceptable range and/or analyze product yield goals for the current semiconductor device and stage of fabrication.

One example of a use of system 800 is as follows: if manufacturing 804 included exposing chip/wafer 802 to a photomask, three-dimensional model 812 may include new exposure times to correct for overexposure or underexposure. Even though chip/wafer 802 may have a lower yield than expected because of the previous exposure time, chip/wafer 818 could undergo manufacturing 804 with updated parameters and could receive the exposure time that would maintain a higher yield. This is only an example of the feedback aspect and is not intended to indicate the only use.

Figure 9:
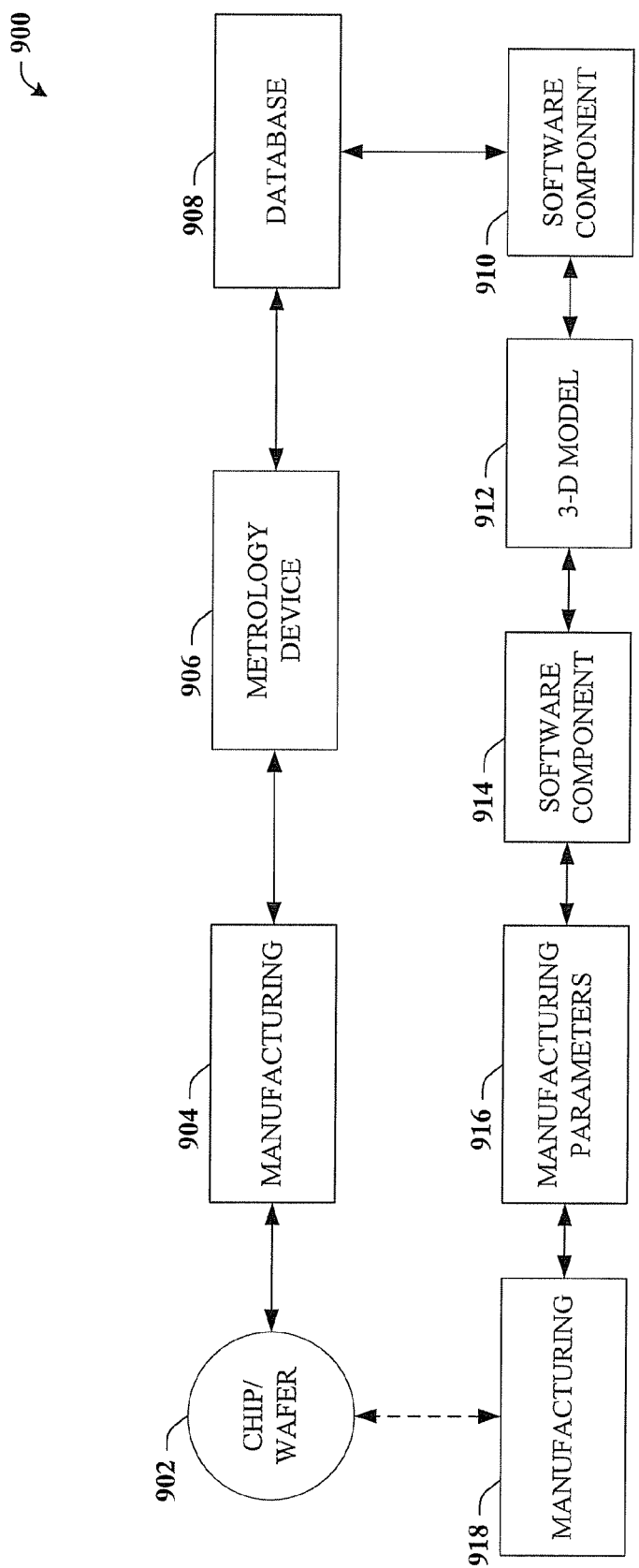
FIG. 9 is a block diagram illustrating a system that utilizes the three-dimensional model to facilitate a feed-forward loop for manufacturing process control.

Turning now to FIG. 9, a block diagram of a system 900 that can employ a feed-forward loop to adjust a semiconductor manufacturing process is depicted. Chip/wafer 902 can undergo a manufacturing step 904. Manufacturing step 904 may be any step performed in a semiconductor manufacturing process. After manufacturing step 904, chip/wafer 902 can be examined by a metrology device 906 to resolve particular measurements. Metrological device 906 can supply measurements of features of the chip/wafer 902 to database 908. Software component 910 can access database 908 to construct three-dimensional model 912. Software component 914 can utilize three-dimensional model 912 to produce manufacturing step parameters 916. Manufacturing step parameters 916 can modify the actions taken by manufacturing step 918. Manufacturing step 918 can use the manufacturing step parameters 916 to perform actions on chip/wafer 902. System 900 is an example of one embodiment on a feed-forward manufacturing process utilizing the claimed subject matter. Feed-forward processes in general are used to adjust action occurring on a chip/wafer (e.g., chip/wafer 902) in subsequent activity to achieve the objectives of the manufacturer. Such objectives can include increasing yield, ensuring performance metrics are met, reducing manufacturing costs and the like. System 900 is one aspect of a feed-forward system and is not intended to be an exhaustive example of feed-forward uses in connection with the claimed subject matter. One or more modifications to the production process may be applied to the chip/wafer in the process, and real-time or subsequent monitoring can also be performed.

One example in which system 900 can be used in a feed-forward manufacturing process is when one of the layers of a transistor has been incorrectly created in manufacturing 904. Since this error, e.g., incorrect thickness or dimensions, has been detected before manufacturing 916, yield and performance of chip/wafer 902 may be increased despite the error that occurred in manufacturing 904. For example, the event that occurred at manufacturing 904 may have created viable integrated circuits but only at a different clock speed than was originally planned. Since software component 914 detected this deviation, manufacturing parameters 916 can be created to optimize chip/wafer 902 at this updated clock speed. Thus, manufacturing 918 can modify chip/wafer 902 to maximize yield and performance based upon this new clock speed. It is to be appreciated that his particular example is not intended to limit scope of the claimed subject matter but is merely exemplary and intended to aide in understanding.

Figure 10:
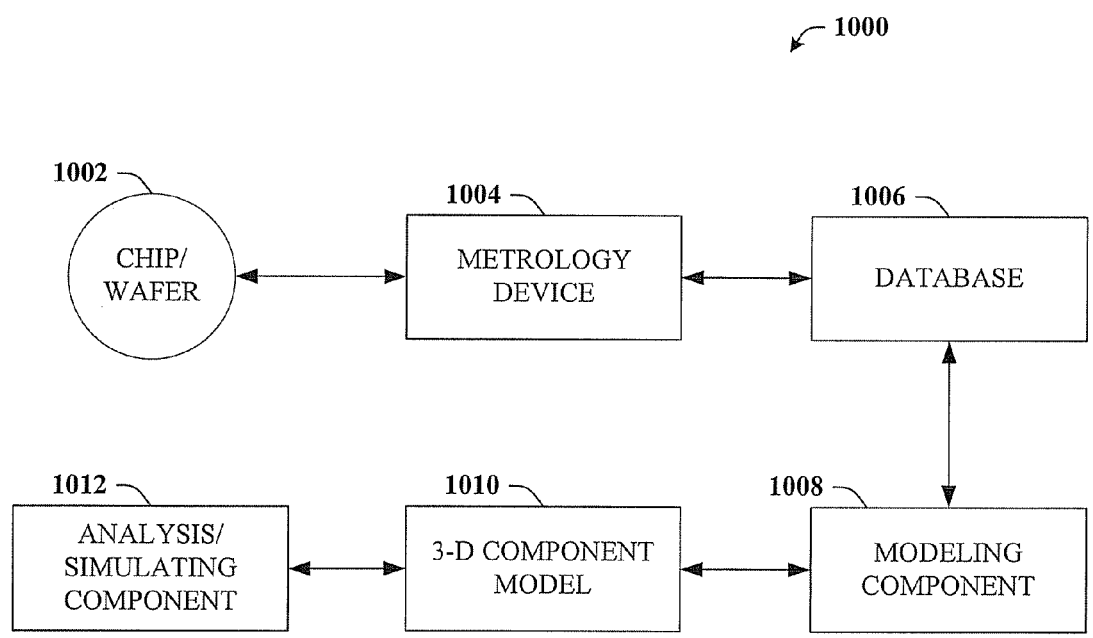
FIG. 10 is a block diagram illustrating a system utilizing metrological data to form a three-dimensional model for use in an analysis or simulation software.

Referring now to FIG. 10, a block diagram illustrating a system 1000 that can create a three-dimensional model for use in analysis or simulation software is depicted. Similar to what has been described supra, chip/wafer 1002 can be exposed to metrology device 1004 to ascertain chip/wafer 1002 feature information. This metrological information can be input into database 1006. Modeling component 1008 can access database 1006 and construct three-dimensional component model 1010. The three-dimensional component model can be used by analysis or simulation component 1012. Three-dimensional component model 1012 may be a three-dimensional model of a component or a set of components of chip/wafer 1002. Analysis or simulation software may be current off-the-shelf software or other component 1012 to perform analysis or simulation of the desired feature or set of features of chip/wafer 1002. The three-dimensional component model 1010 may be a three-dimensional model of one specific feature, multiple features and/or a statistical model of a set of features.

For example, the three-dimensional component model 1010 can be a representation of chip/wafer 1002 transistors connected to a bus path, where the slowest connection dictates the fastest operating speed of the bus. Three-dimensional component model 1010 can model these features and provide the features to analysis/simulating component 1012 so that analysis/simulating component 1012 can determine this parameter. This could be useful, for example, in a research and development environment. In addition, other aspects are contemplated and what is presented here is not indeed to be exhaustive.

Figure 11:
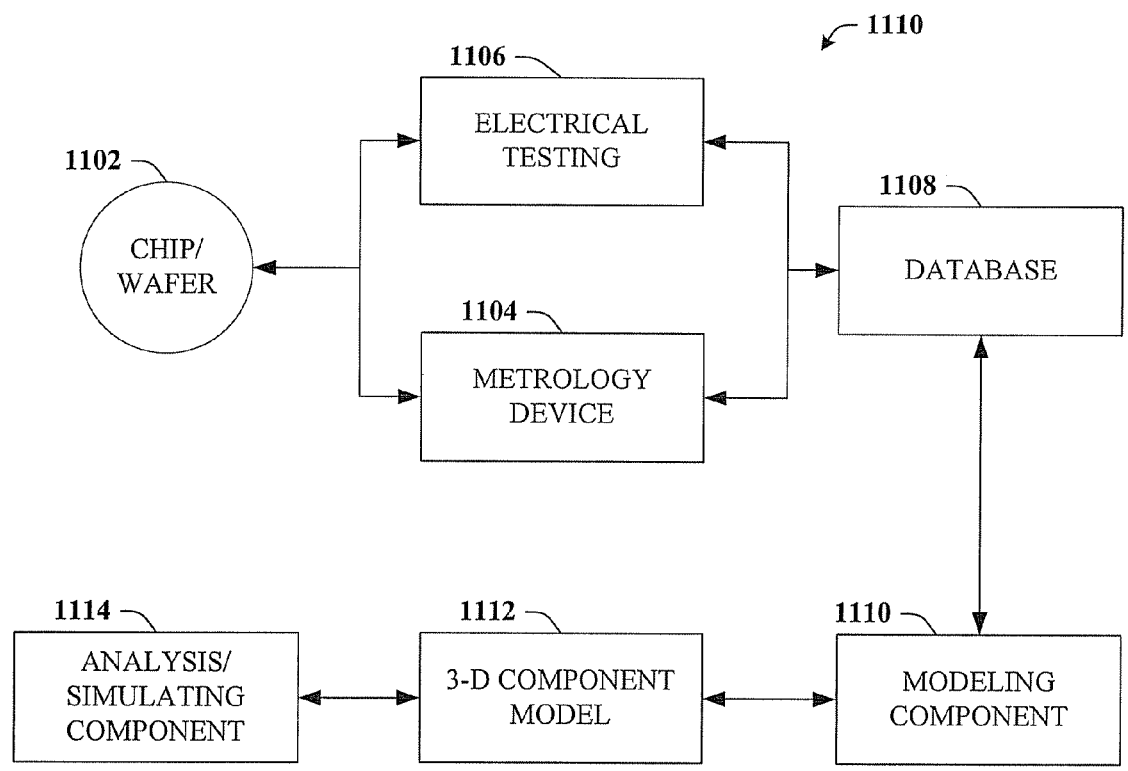
FIG. 11 is a block diagram illustrating a system utilizing metrological data and electrical measurement data for forming a three-dimensional model for use in an analysis or simulation software.

With reference now to FIG. 11, a block diagram illustrating a system 1100 that can generate a three-dimensional model from metrological and electrical data is depicted. That is, metrological techniques can be used in conjunction with electrical testing to assist the creation of a three-dimensional model. Generally, the system 1100 can include a chip/wafer 1102 from which a metrology device 1104 can be extract feature measurements. Metrology device 1104 can produce data that is placed into database 1108. In addition, chip/wafer 1102 can be exposed to electrical testing 1106. The results from electrical testing 1106 can also be inserted into database 1108. Measurements obtained by the metrology device 1104 and during electrical testing 1106 may occur simultaneously. Alternatively, measurements obtained by the metrology device 1104 may occur before or after electrical testing 1106.

Modeling component 1110 can access database 1108 and construct three-dimensional component model 1112. The three-dimensional component model 1112 can be utilized by analysis or simulation component 1114. Three-dimensional component model 1112 may be a three-dimensional model of a component or a set of components of chip/wafer 1102. Analysis or simulation component 1114 may be current off-the-shelf software or other software to perform analysis or simulation of the desired feature or set of features of chip/wafer 1102. Three-dimensional component model 1112 may be a three-dimensional model of one specific feature, multiple features and/or a statistical model of a set of features.

For an illustration as to how electrical testing 1106 and metrological techniques can be used to create a three-dimensional component model 1112 consider that oftentimes a manufacturing technique is employed that changes the composition of one of the layers on the chip/wafer 1102.

For example, it is common to modify the features of differing layers through techniques such as ion bombardment. However, ion bombardment can change the electrical characteristics of a layer and electrical testing 1106 can thus aide modeling component 1110 to model these electrical features. Without such testing, modeling component 1110 may rely on other means of estimating the electrical characteristics of a feature, but direct measurement may be more accurate.

Figure 12:
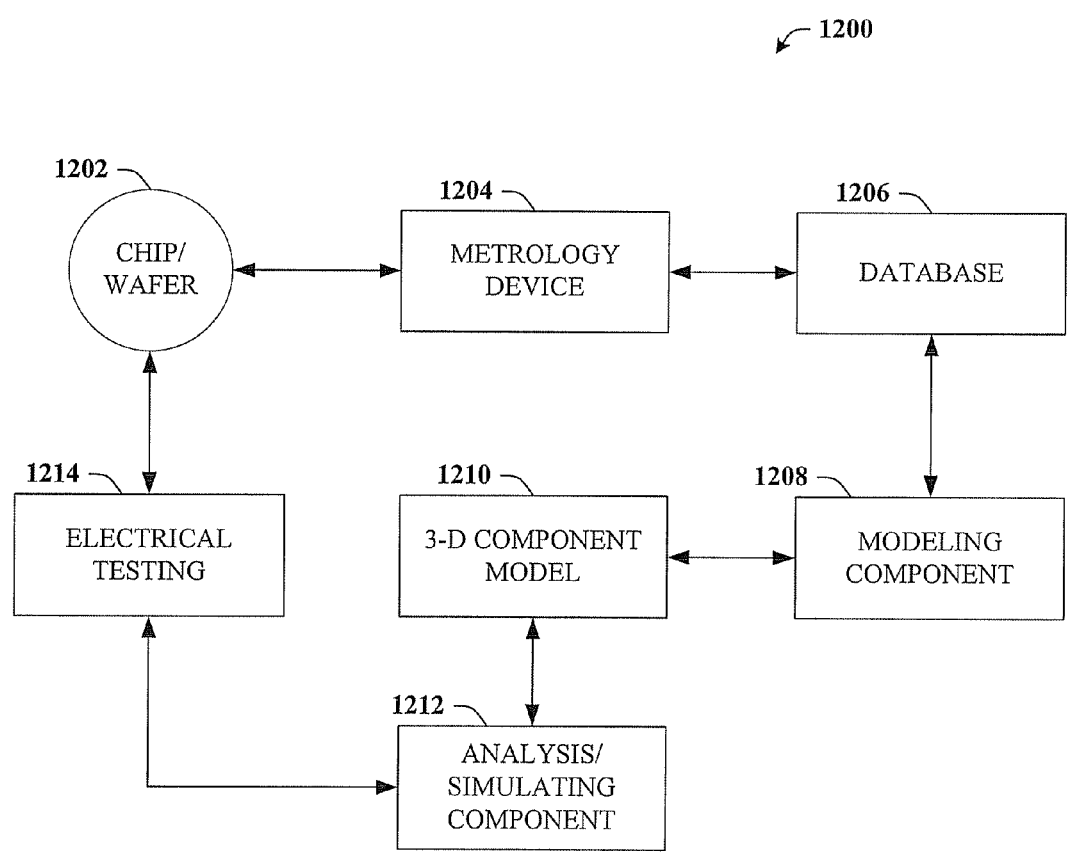
FIG. 12 is a block diagram illustrating a system utilizing metrological information for use in an analysis or simulation software in conjunction with electrical testing.

Turning now to FIG. 12, a block diagram of a system 1200 that can create a three-dimensional model for use in analysis or simulation software is illustrated. According to an aspect of the claimed invention, metrology device 1204 can perform measurements on chip/wafer 1202. Accordingly, metrology device 1204 can produce data that is placed into database 1208. Modeling component 1208 can access database 1206, e.g., in order to construct three-dimensional component model 1210. In addition, electrical testing 1214 can be conducted to create metrics about chip/wafer 1202. The three-dimensional component model 1210 may be used by an analysis or simulation component 1212 in conjunction with electrical testing 1214. Three-dimensional component model 1212 may be a three-dimensional model of a feature or a set of features of chip/wafer 1202.

Analysis or simulation component 1212 may be current off-the-shelf software or other software to perform analysis or simulation of the desired feature or set of features of chip/wafer 1202. The three-dimensional component model 1210 may be a three-dimensional model of a specific feature or multiple features or a statistical model of a set of features. Analysis or simulation component 1212 may be employed to aide in comparing predicted performance to actual performance, determining performance characteristics or for adjusting part of a manufacturing process (not shown) so that performance or yield goals are met. The possible operations performed by the analysis or simulation component 1212 listed herein are not meant to be an exhaustive list of possible uses.

Figure 13:
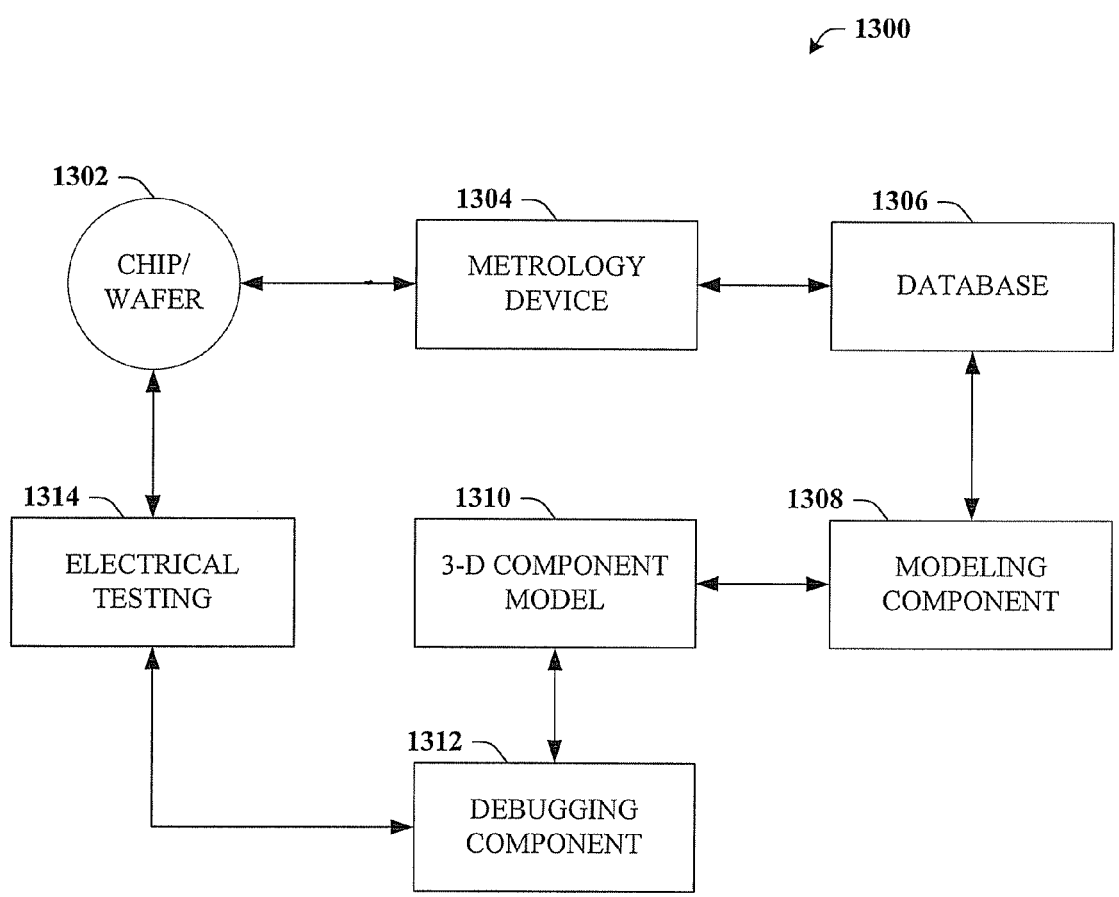
FIG. 13 is a block diagram illustrating a system utilizing metrological data to form a three-dimensional model for use in debugging software in conjunction with electrical testing.

Referring now to FIG. 13, a block diagram illustrating a system 1300 that can produce a three-dimensional model for use for debugging of semiconductor wafers is depicted. In this aspect of the claimed subject matter, the chip/wafer 1302 undergoes measurements provided by metrology device 1304 that can be stored into database 1308 as previously described. In addition, modeling component 1308 can database 1306 and construct three-dimensional component model 1310, with electrical testing 1314 conducted in order to, e.g., create metrics about chip/wafer 1302. The three-dimensional component model 1310 can be used by debugging component 1312 in conjunction with electrical testing 1314. Three-dimensional component model 1312 may be a three-dimensional model of a component or a set of components of chip/wafer 1302. Debugging component 1312 may be used to further refine the manufacturing process, determine possible sources of low yield, or otherwise to find causes of incorrect or unexpected semiconductor manufacturing process results. System 1300 may be used in a research and development environment or used to determine optimal semiconductor production parameters. Not all of the possible methods for use of system 1300 are listed herein but varying embodiments will be apparent to one of ordinary skill in the art with reference to FIG. 13 and by references other aspects herein.

One such aspect of the claimed subject matter can use the electrical testing 1314 to reduce the list of features that need to be analyzed. For example, if chip/wafer 1302 encounters difficulty interfacing with an external bus, it may take a substantial amount of time to run computations on all the data stored in database 1306. Electrical testing 1314 might be employed to help an engineer discover that one of the output pins on chip/wafer 1302 had an output impedance much higher than what the original specifications required. Electrical testing 1314 can therefore reduce the number of features that need be modeled such that computational analysis becomes more efficient and/or relevant. Therefore, an analysis or simulation component could then only look for problems in the wafer on a reduced set of features. This example is only explanatory and is not intended to limit the scope of what has been described herein.

Figure 14:
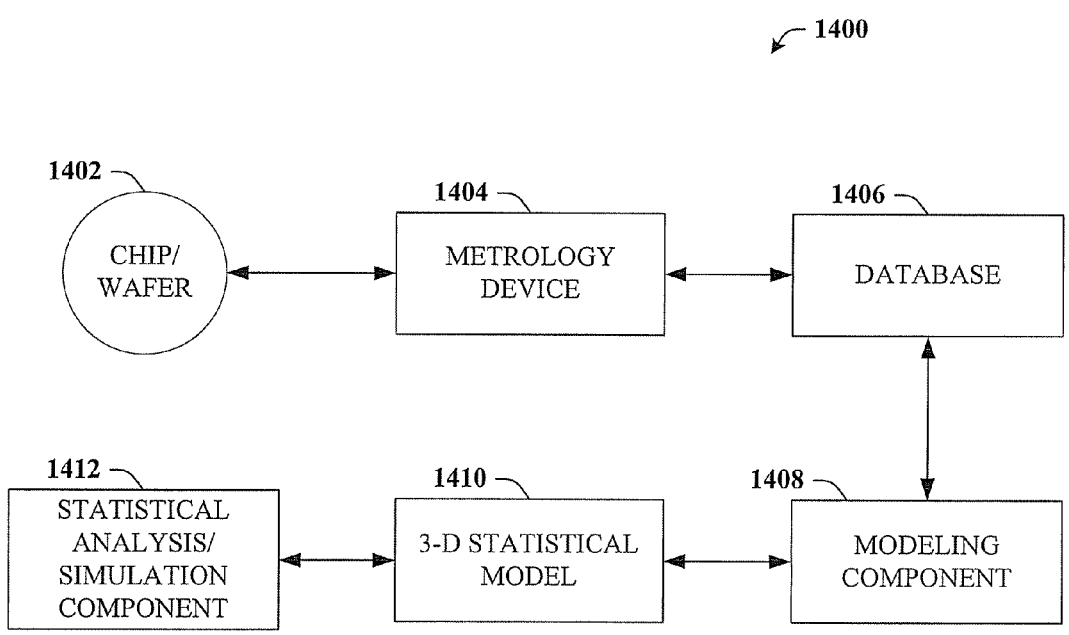
FIG. 14 illustrates a methodology for utilizing metrological information for forming a three dimensional statistical model.

Referring now to FIG. 14, a block diagram illustrating a system 1400 that can provide a three-dimensional statistical model is shown. A three-dimensional statistical model can be used in connection with analysis or simulation software. In general, the system 1400 can include a chip/wafer 1402 that can be exposed to certain feature measurements by metrology device 1404. Metrology device 1404 can yield data that is placed into database 1408. Modeling component 1408 can access database 1406 and construct a three-dimensional statistical model 1410. The three-dimensional statistical model can be utilized by statistical analysis/simulation component 1412. The three-dimensional statistical model 1410 may include performance data, shape data, or other characters of more than one feature of chip/wafer 1402 for use in improving the production process. The three-dimensional component statistical model 1410 may include such information as a probability density function of X, Y, Z-axis data of multiple features of chip/wafer 1402. Additionally or alternatively, three-dimensional statistical model 1410 may include information about the performance characteristics in a probability density function so that parameters such as maximum clock speed that may be employed for correct critical path operation.

One possible use of three-dimensional statistical model 1410 is to determine how accurately the transistors (or other features) were produced. For example, during the manufacturing process, several transistors may all be intended to have the same designed dimensions but because a manufacturing process can sometimes produce variances, there may be some deviation in the shape of the various transistors. Statistical analysis/simulation component 1412 may be used to analyze these variations and possibly determine a cause of the variation with regard to the manufacturing process. Again, the foregoing is simply one aspect of the claimed subject matter and is not indented to be exhaustive. It is to be further appreciated that the metrology device 1404 (as well as devices 806, 906, 1004, 1104, 1204 and 1304 associated with FIGS. 8-13, respectively) can be one or more metrological instruments for measuring one or more features of a chip/wafer.

Figure 15:
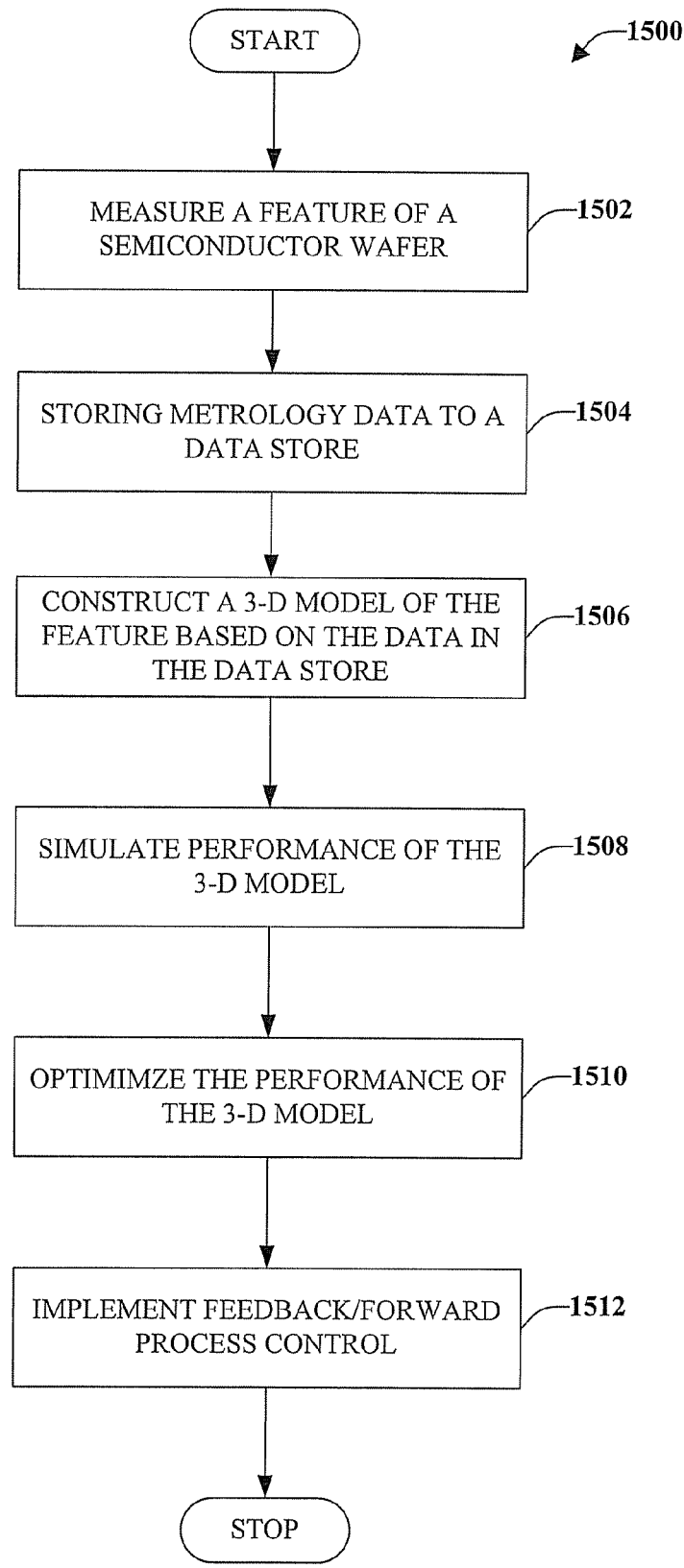
FIG. 15 illustrates an exemplary flow chart of procedures for employing metrology data to construct three-dimensional model of a feature on a wafer.

Turning now to FIG. 15, an exemplary computer implemented methodology 1500 for determining a three-dimensional shape of a feature on a semiconductor wafer is illustrated. Generally, at 1502 one or more features (e.g., a transistor gate) of a wafer can be measured. The measurements can be provide by one or more metrology tools in order to, e.g., obtain views of the feature based upon distinct planar perspectives. For example, one metrology device can measure a top-down view of the feature, while another metrology device can measure a side-view of the feature.

At 1504, metrology data obtained in act 1502 by the metrology devices can be stored to a data store. It is to be appreciated that other data such as data received from electrical testing can also be input to the data store. At 1506, a three-dimensional model of the feature(s) can be constructed based upon the data in the data store. Thus, the three-dimensional model can be created from, e.g., the distinct planar perspectives generated at act 1502 extrapolated into three dimensions.

At 1508, the performance of the three-dimensional model can be simulated. For example, the three-dimensional model (as well as data from electrical testing) can be employed to calibrate device simulators and/or predict the performance of devices (e.g., an integrated circuit) or features of the devices still in the manufacturing process. At 1510, optimization algorithms can be applied to the three-dimensional model, e.g., to determine enhancements to the model. It is to be appreciated that an optimized topology can be simulated as well as described in act 1510.

Accordingly, if it is determined that the device can be optimized and/or other modifications are necessary to adjust the performance of the device or a subset of the features of the device, then the manufacturing process can be altered as a result. For example, at 1512 process control can be implemented in real-time based upon the information and/or analysis determined at acts 1506-1508. The process control can affect any of the stages of semiconductor fabrication by employing a feedback loop to adjust one or more of the fabrication processes. In addition, the process control can affect many of the stages of semiconductor fabrication in a feed-forward manner to alter the device in situ. Generally, the feed-forward process control will affect the gate patterning process, but other stages are contemplated to be within the scope and spirit of the claimed subject matter.

As an example, consider a process to refine a manufacturing process. For instance, suppose that a particular transistor is operating at a speed that is too slow. The simulator with the three-dimensional metrology information, possibly in conjunction with electrical testing, could determine that a particular layer should be thinned or narrowed to improve gate performance. The simulator could then communicate this information to a process controller such that the next wafer can undergo that manufacturing step would then have modified gate shapes. In addition, the results of the modification can be confirmed to ensure that the manufacturing step changes were successful.

Figure 16:
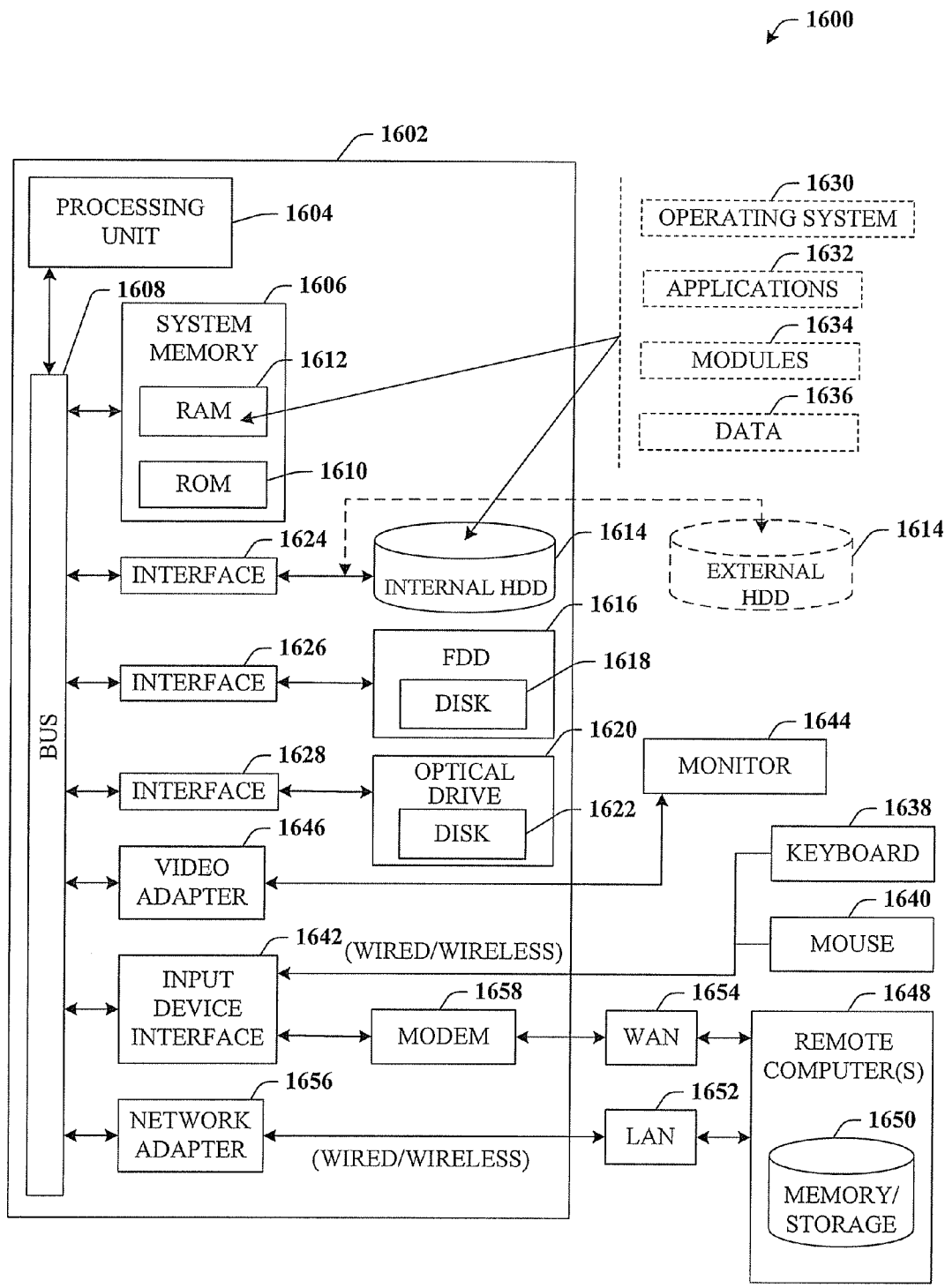
FIG. 16 illustrates a block diagram of a computer operable to execute the disclosed architecture.

Referring now to FIG. 16, there is illustrated a block diagram of an exemplary computer system operable to execute the disclosed architecture. In order to provide additional context for various aspects of the claimed subject matter, FIG. 16 and the following discussion are intended to provide a brief, general description of a suitable computing environment 1600 in which the various aspects of the claimed subject matter can be implemented. For example, various components of the systems and/or aspects thereof described supra can be implemented by way of the system 1600. Additionally, while the claimed subject matter has been described above in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 16, the exemplary environment 1600 for implementing various aspects of the claimed subject matter includes a computer 1602, the computer 1602 including a processing unit 1604, a system memory 1606 and a system bus 1608. The system bus 1608 couples to system components including, but not limited to, the system memory 1606 to the processing unit 1604. The processing unit 1604 can be any of various commercially available processors. Dual microprocessors and other multi-processor architectures may also be employed as the processing unit 1604.

The system bus 1608 can be any of several types of bus structure that may further interconnect to a memory bus (with or without a memory controller), a peripheral bus, and a local bus using any of a variety of commercially available bus architectures. The system memory 1606 includes read-only memory (ROM) 1610 and random access memory (RAM) 1612. A basic input/output system (BIOS) is stored in a non-volatile memory 1610 such as ROM, EPROM, EEPROM, which BIOS contains the basic routines that help to transfer information between elements within the computer 1602, such as during start-up. The RAM 1612 can also include a high-speed RAM such as static RAM for caching data.

The computer 1602 further includes an internal hard disk drive (HDD) 1614 (e.g., EIDE, SATA), which internal hard disk drive 1614 may also be configured for external use in a suitable chassis (not shown), a magnetic floppy disk drive (FDD) 1616, (e.g., to read from or write to a removable diskette 1618) and an optical disk drive 1620, (e.g., reading a CD-ROM disk 1622 or, to read from or write to other high capacity optical media such as the DVD). The hard disk drive 1614, magnetic disk drive 1616 and optical disk drive 1620 can be connected to the system bus 1608 by a hard disk drive interface 1624, a magnetic disk drive interface 1626 and an optical drive interface 1628, respectively. The interface 1624 for external drive implementations includes at least one or both of Universal Serial Bus (USB) and IEEE 1694 interface technologies. Other external drive connection technologies are within contemplation of the claimed subject matter.

The drives and their associated computer-readable media provide nonvolatile storage of data, data structures, computer-executable instructions, and so forth. For the computer 1602, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. It is appreciated that the claimed subject matter can be implemented with various commercially available operating systems or combinations of operating systems.

A user can enter commands and information into the computer 1602 through one or more wired/wireless input devices, e.g., a keyboard 1638 and a pointing device, such as a mouse 1640. Other input devices (not shown) may include a microphone, an IR remote control, a joystick, a game pad, a stylus pen, touch screen, or the like. These and other input devices are often connected to the processing unit 1604 through an input device interface 1642 that is coupled to the system bus 1608, but can be connected by other interfaces, such as a parallel port, an IEEE 1694 serial port, a game port, a USB port, an IR interface, etc.

A monitor 1644 or other type of display device is also connected to the system bus 1608 via an interface, such as a video adapter 1646. In addition to the monitor 1644, a computer typically includes other peripheral output devices (not shown), such as speakers, printers, etc.

The computer 1602 may operate in a networked environment using logical connections via wired and/or wireless communications to one or more remote computers, such as a remote computer(s) 1648. The remote computer(s) 1648 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1650 is illustrated. The logical connections depicted include wired/wireless connectivity to a local area network (LAN) 1652 and/or larger networks, e.g., a wide area network (WAN) 1654. Such LAN and WAN networking environments are commonplace in offices and companies, and facilitate enterprise-wide computer networks, such as intranets, all of which may connect to a global communications network, e.g., the Internet.

When used in a LAN networking environment, the computer 1602 is connected to the local network 1652 through a wired and/or wireless communication network interface or adapter 1656. The adapter 1656 may facilitate wired or wireless communication to the LAN 1652, which may also include a wireless access point disposed thereon for communicating with the wireless adapter 1656.

When used in a WAN networking environment, the computer 1602 can include a modem 1658, or is connected to a communications server on the WAN 1654, or has other means for establishing communications over the WAN 1654, such as by way of the Internet. The modem 1658, which can be internal or external and a wired or wireless device, is connected to the system bus 1608 via the serial port interface 1642. In a networked environment, program modules depicted relative to the computer 1602, or portions thereof, can be stored in the remote memory/storage device 1650. It will be appreciated that the network connections shown are exemplary and other means of establishing a communications link between the computers can be used.

The computer 1602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 17:
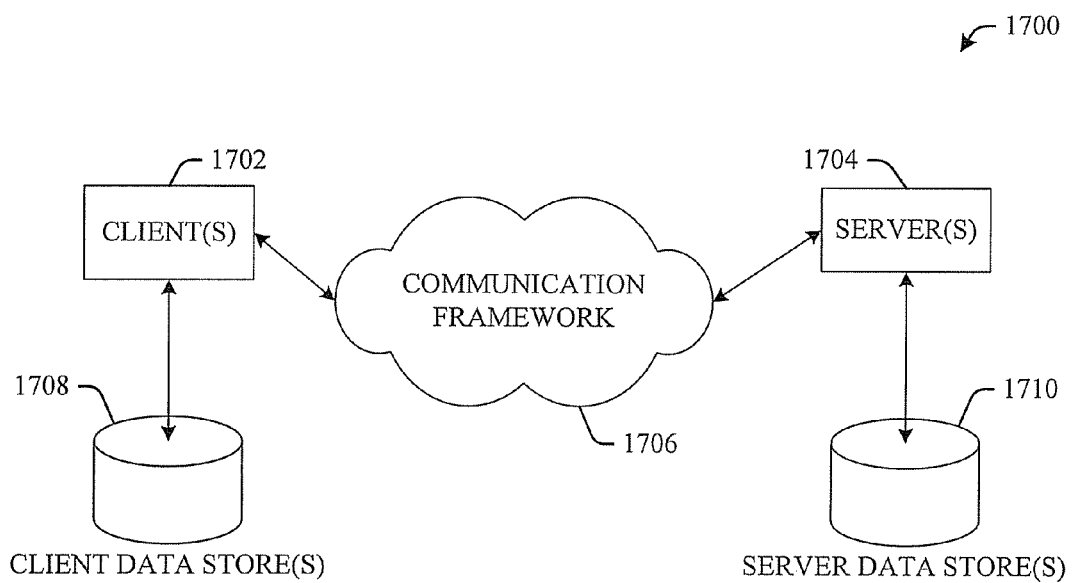
FIG. 17 illustrates a schematic block diagram of an exemplary computing environment.

Referring now to FIG. 17, there is illustrated a schematic block diagram of an exemplary computer compilation system operable to execute the disclosed architecture. The system 1700 includes one or more client(s) 1702. The client(s) 1702 can be hardware such as a digital camera with computer interface support and/or software (e.g., threads, processes, computing devices). The client(s) 1702 can house cookie(s) and/or associated contextual information by employing the claimed subject matter, for example.

The system 1700 also includes one or more server(s) 1704. The server(s) 1704 can also be hardware and/or software (e.g., threads, processes, computing devices). The servers 1704 can house threads to perform transformations by employing the claimed subject matter, for example. One possible communication between a client 1702 and a server 1704 can be in the form of a data packet adapted to be transmitted between two or more computer processes. The data packet may include a cookie and/or associated contextual information, for example. The system 1700 includes a communication framework 1706 (e.g., a global communication network such as the Internet) that can be employed to facilitate communications between the client(s) 1702 and the server(s) 1704.

Communications can be facilitated via a wired (including optical fiber) and/or wireless technology. The client(s) 1702 are operatively connected to one or more client data store(s) 1708 that can be employed to store information local to the client(s) 1702 (e.g., cookie(s) and/or associated contextual information). Similarly, the server(s) 1704 are operatively connected to one or more server data store(s) 1710 that can be employed to store information local to the servers 1704.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer implemented system that accurately models a feature of a semiconductor wafer in three dimensions, comprising:
   a data store that receives metrology data associated with a feature of a semiconductor wafer;
   a modeling component that creates a three-dimensional model of the feature based at least in part on the metrology data;
   an analysis component that employs the three-dimensional model to predict a performance parameter for the feature and infer at least one wafer design modification that improves performance of the feature; and
   a control component that outputs feedback or feed forward information to modify the fabrication process of the next or the current wafer to implement the inferred design modification.

2. The system of claim 1, the data store receives the metrology data in real-time as the feature is manufactured.

3. The system of claim 1, the data store receives the metrology data from at least one of a polysilicon thickness measurement sensor, a polysilicon FICD measurement sensor, a source/drain implant mask, an optical camera, a scanning electron microscope, an optical reflectometry sensor, an atomic force microscope, and a device that resolves electrical measurements.

4. The system of claim 1, the performance parameter is at least one of a speed value, a height value, a dimension value, a shape value, a probability density function of a shape, a critical path metric, a clock value through a critical path, a semiconductor yield value, or a difference value to determine if a photomask was correctly aligned.

5. The system of claim 1, the analysis component analyzes the three-dimensional model and infers a modification to the model that brings performance of the feature within a desired threshold.

6. The system of claim 5, the modified model achieves a desired metric for the performance parameter.

7. The system of claim 5, the modification to the model is based at least in part upon user input.

8. The system of claim 6, the analysis component infers a modification to the feature that results in an optimized feature associated with the model.

9. The system of claim 8, the analysis component determines a modification to a manufacturing parameter that results in the optimized feature.

10. The system of claim 8, further comprising a control component that transmits control information that relates to the modification to the feature.

11. The system of claim 10, the control information instructs a manufacturing device to manufacture the optimized feature.

12. The system of claim 10, the control information is transmitted by way of a feedback loop and a feed-forward loop.

13. A method for determining a three-dimensional shape of a feature on a semiconductor wafer, comprising:
    measuring a feature of a semiconductor wafer;
    storing metrology data relating to the measuring in a data store;
    constructing a three-dimensional model of the feature based at least in part upon the metrology data;
    predicting a performance parameter for the feature based at least in part upon the three dimensional model;
    inferring at least one wafer design modification that improves performance of the feature; and
    outputting feedback or feed forward information to modify the fabrication process of the next or the current wafer to implement the inferred design modification.

14. The method of claim 13, further comprising simulating a performance parameter of the feature based at least in part upon the three-dimensional model.

15. The method of claim 14, the simulating the performance parameter occurs during fabrication of the semiconductor wafer and prior to a time when the performance parameter can be measured.

16. The method of claim 14, further comprising optimizing the performance parameter by adjusting the three-dimensional model and simulating the feature using the adjusted three-dimensional model.

17. The method of claim 16, further comprising:
    determining a new feature design in connection with the adjusted three-dimensional model; and providing control information to the fabrication process that implements the new feature design on the semiconductor wafer.

18. A system that constructs a three-dimensional model of semiconductor wafer features, comprising:
  means for collecting metrology data from a feature on a semiconductor wafer;
  means for constructing a three-dimensional model based at least in part on the metrology data;
  means for predicting a performance parameter for the feature based at least in part upon the three dimensional model;
  means for inferring at least one wafer design modification that improves performance of the feature; and
  means for outputting feedback or feed forward information to modify the fabrication process of the next or the current wafer to implement the inferred design modification.

19. The system of claim 18, further comprising:
means for predicting a performance of the feature; and
means for updating a manufacturing process that manufactures the feature.

* * * * *